United States Patent
McKinnon et al.

(10) Patent No.: US 11,097,644 B2
(45) Date of Patent: Aug. 24, 2021

(54) AWNING ARM WITH INTEGRATED LIGHT SOURCE

(71) Applicant: Lippert Components, Inc., Elkhart, IN (US)

(72) Inventors: Scott C. McKinnon, Union City, MI (US); Steve Jenkins, Union, MI (US); Josh Black, Mishawaka, IN (US); Byron Brown, Middlebury, IN (US); Brian M. Worthman, Goshen, IN (US); Catherine Kline, Bronson, MI (US)

(73) Assignee: Lippert Components, Inc., Elkhart, IN (US)

( * ) Notice: Subject to any disclaimer, the term of this patent is extended or adjusted under 35 U.S.C. 154(b) by 147 days.

(21) Appl. No.: 16/568,541

(22) Filed: Sep. 12, 2019

(65) Prior Publication Data

US 2020/0079269 A1    Mar. 12, 2020

Related U.S. Application Data

(60) Provisional application No. 62/730,324, filed on Sep. 12, 2018.

(51) Int. Cl.
| | |
|---|---|
| *F21V 21/00* | (2006.01) |
| *B60P 3/34* | (2006.01) |
| *B60Q 1/26* | (2006.01) |
| *B60Q 1/24* | (2006.01) |
| *E04F 10/06* | (2006.01) |
| *B60J 3/00* | (2006.01) |

(52) U.S. Cl.
CPC ............... *B60P 3/343* (2013.01); *B60J 3/002* (2013.01); *B60J 3/005* (2013.01); *B60Q 1/2607* (2013.01); *B60Q 1/2661* (2013.01); *B60Q 1/2696* (2013.01); *E04F 10/06* (2013.01); *E04F 10/0611* (2013.01); *E04F 10/0666* (2013.01); *B60Q 1/24* (2013.01)

(58) Field of Classification Search
CPC ..... B60P 3/343; B60Q 1/2607; B60Q 1/2661; B60Q 1/2696; B60Q 1/24; B60J 3/002; B60J 3/005; E04F 10/06; E04F 10/0666; E04F 10/0611; F21S 4/28; F21S 8/04; F21S 8/043; F21S 8/028
USPC ....... 362/152, 485, 543, 544, 545, 253, 234; 160/127
See application file for complete search history.

(56) References Cited

U.S. PATENT DOCUMENTS

| | | |
|---|---|---|
| 4,164,972 A | 8/1979 | Bennett |
| 4,796,393 A | 1/1989 | Toti |
| 4,945,624 A | 8/1990 | Toti |
| 5,148,849 A | 9/1992 | Faludy |
| 5,180,223 A * | 1/1993 | McNamee ............. B60Q 1/305 362/223 |
| 5,381,844 A | 1/1995 | Struben |
| 5,400,813 A | 3/1995 | Swan, Jr. |
| 5,577,830 A | 11/1996 | Barry et al. |
| 5,873,202 A | 2/1999 | Parks |
| 6,267,130 B1 | 7/2001 | Konda |

(Continued)

*Primary Examiner* — Laura K Tso
(74) *Attorney, Agent, or Firm* — Nixon & Vanderhye P.C.

(57) ABSTRACT

An awning system includes lighting units integrated with support arms thereof. The lighting units are configured to direct light emitted thereby primarily toward a canopy thereof when the canopy is fully deployed.

16 Claims, 7 Drawing Sheets

(56) References Cited

U.S. PATENT DOCUMENTS

| | | | |
|---|---|---|---|
| 6,439,249 B1* | 8/2002 | Pan | A45B 3/04 |
| | | | 135/16 |
| 6,497,191 B2 | 12/2002 | Tomatsu | |
| 7,152,838 B2 | 12/2006 | Taulbee | |
| 7,311,290 B1 | 12/2007 | Barnes | |
| 7,387,483 B1 | 6/2008 | Scheurn | |
| 7,861,990 B2 | 1/2011 | Barnes | |
| 7,871,017 B2* | 1/2011 | Van Zutven | A01G 9/247 |
| | | | 239/289 |
| 8,113,259 B2 | 2/2012 | Tessmer | |
| 8,267,105 B1 | 9/2012 | Denmark, Jr. | |
| 8,616,721 B1 | 12/2013 | Woodall, Jr. | |
| 8,950,460 B2 | 2/2015 | Worthman et al. | |
| 9,228,359 B2 | 1/2016 | Taylor | |
| 9,371,652 B2 | 6/2016 | Malott | |
| 9,695,635 B2 | 7/2017 | Taylor et al. | |
| 9,755,408 B2 | 9/2017 | Taylor | |
| 9,797,157 B2 | 10/2017 | Lovley, II | |
| 9,889,788 B2* | 2/2018 | Beland | E04F 10/0603 |
| 2013/0235558 A1* | 9/2013 | Zhou | F21V 33/006 |
| | | | 362/96 |
| 2014/0110065 A1* | 4/2014 | Beland | E04F 10/0625 |
| | | | 160/66 |
| 2017/0264224 A1* | 9/2017 | Becker | E04F 10/0625 |
| 2020/0208408 A1* | 7/2020 | Borsoi | F21S 9/02 |

\* cited by examiner

AWNING ARM WITH INTEGRATED LIGHT SOURCE

CROSS-REFERENCES TO RELATED APPLICATIONS

This application claims the benefit of U.S. Provisional Patent Application No. 62/730,324, filed Sep. 12, 2018, the entire content of which is herein incorporated by reference.

STATEMENT REGARDING FEDERALLY SPONSORED RESEARCH OR DEVELOPMENT (NOT APPLICABLE)

BACKGROUND

It is known to provide a recreation vehicle (RV), for example, a motorhome or trailer, with a collapsible awning that may be deployed to provide a covered area adjacent the RV and collapsed when the RV is in transit. It also is known to provide such an awning with integral lighting to illuminate the covered area and/or uncovered areas adjacent the covered area. Such lighting typically is in the form of one or more discrete light sources that project light down into the covered area from head units supporting an awning roller, such head units being located at the ends of awning arms that may be extended from and retracted to a base mounted on a wall of the RV.

One disadvantage to such lighting is that the light sources, when the awning is retracted, may not face in a direction that affords useful illumination. For example, with the awning retracted, the light sources may face directly outwardly from the vehicle at a substantial height above the ground so that the light emanating from the light sources does not appreciably light the area immediately adjacent the vehicle. Instead, the light sources may shine into an adjacent camp site, thereby irritating the inhabitants thereof.

SUMMARY

An illustrative awning system includes first and second support assemblies, an awning roller connected between the first and second support assemblies, a first lighting unit disposed on a surface of the first support assembly facing the second support assembly, and a second lighting unit disposed on a surface of the second support assembly facing the first support assembly.

In an exemplary embodiment, an awning system includes a first support assembly having a respective support arm, a second support assembly having a respective support arm, and an awning roller connected between the first support assembly and the second support assembly. A canopy is rollable onto and unrollable from the awning roller. A lighting unit integrated with one of the respective support arms of the first support assembly and the second support assembly is configured to direct light emitted thereby primarily toward the canopy when the canopy is fully deployed. The lighting unit may be configured to direct the light emitted thereby primarily inward when the canopy may be fully collapsed.

A bezel may be interposed between the lighting unit and the one of the respective support arms, where the bezel positions the lighting unit at an angle relative to the one of the respective support arms. The bezel may be secured to the one of the respective support arms via a mechanical fastener. The one of the respective support arms may include at least one first connector opening, and the bezel may include a corresponding at least one second connector opening. In this context, the mechanical fastener may extend through the at least one first connector opening and the at least one second connector opening. The bezel may include a lighting unit connector opening, where the lighting unit has a connector block that engages the lighting unit connector opening. The one of the respective support arms may include a third connector opening, where the connector block extends through the lighting unit connector opening in the bezel and into the third connector opening. The angle may be relative to a plane defined by the one of the respective support arms such that the plane varies based on a position of the one of the respective support arms. When the canopy is fully deployed, the plane may be essentially horizontal relative to ground, and when the canopy is fully collapsed, the plane may be essentially vertical relative to ground. The angle may be about 20 degrees.

In some embodiments, the system includes two of the lighting units respectively integrated with each of the respective support arms of the first support assembly and the second support assembly. The two lighting units may be respectively attached to facing inside surfaces of the respective support arms of the first support assembly and the second support assembly.

In another exemplary embodiment, an awning system includes a base, a first pivot arm and a second pivot arm coupled with the base and pivotable relative to the base, an awning roller connected between the first and second pivot arms, and a canopy supported on the awning roller. A light strip coupled with at least one of the first and second pivot arms is oriented to direct light emitted thereby primarily toward the canopy when the canopy is fully deployed and inward when the canopy is fully collapsed. The at least one light strip may be an LED light strip.

BRIEF DESCRIPTION OF THE DRAWINGS

These and other aspects and advantages will be described in detail with reference to the accompanying drawings, in which.

DETAILED DESCRIPTION

Figure 1:
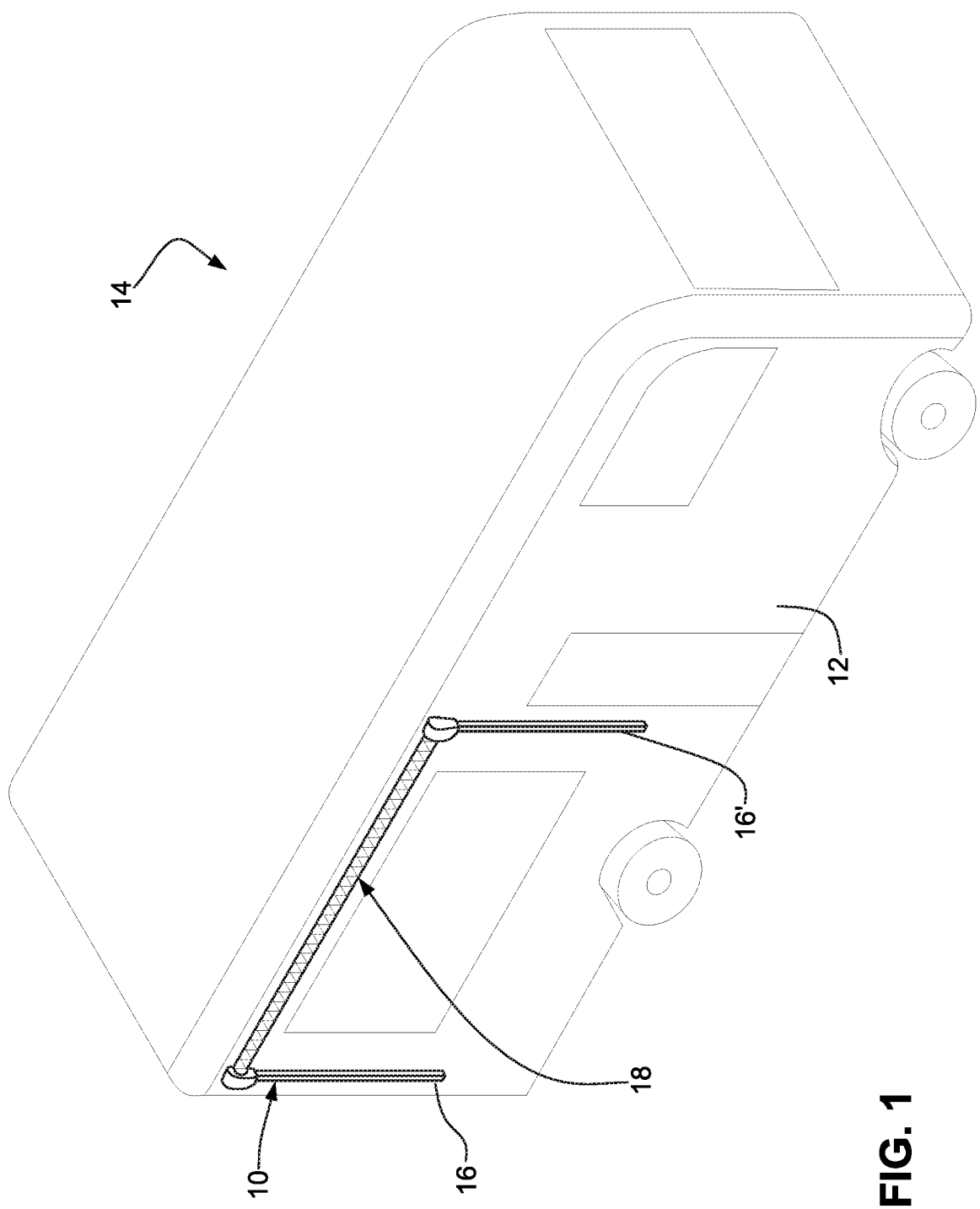
FIG. 1 shows an RV on which is installed an illustrative awning system according to the present disclosure.
Figure 2:
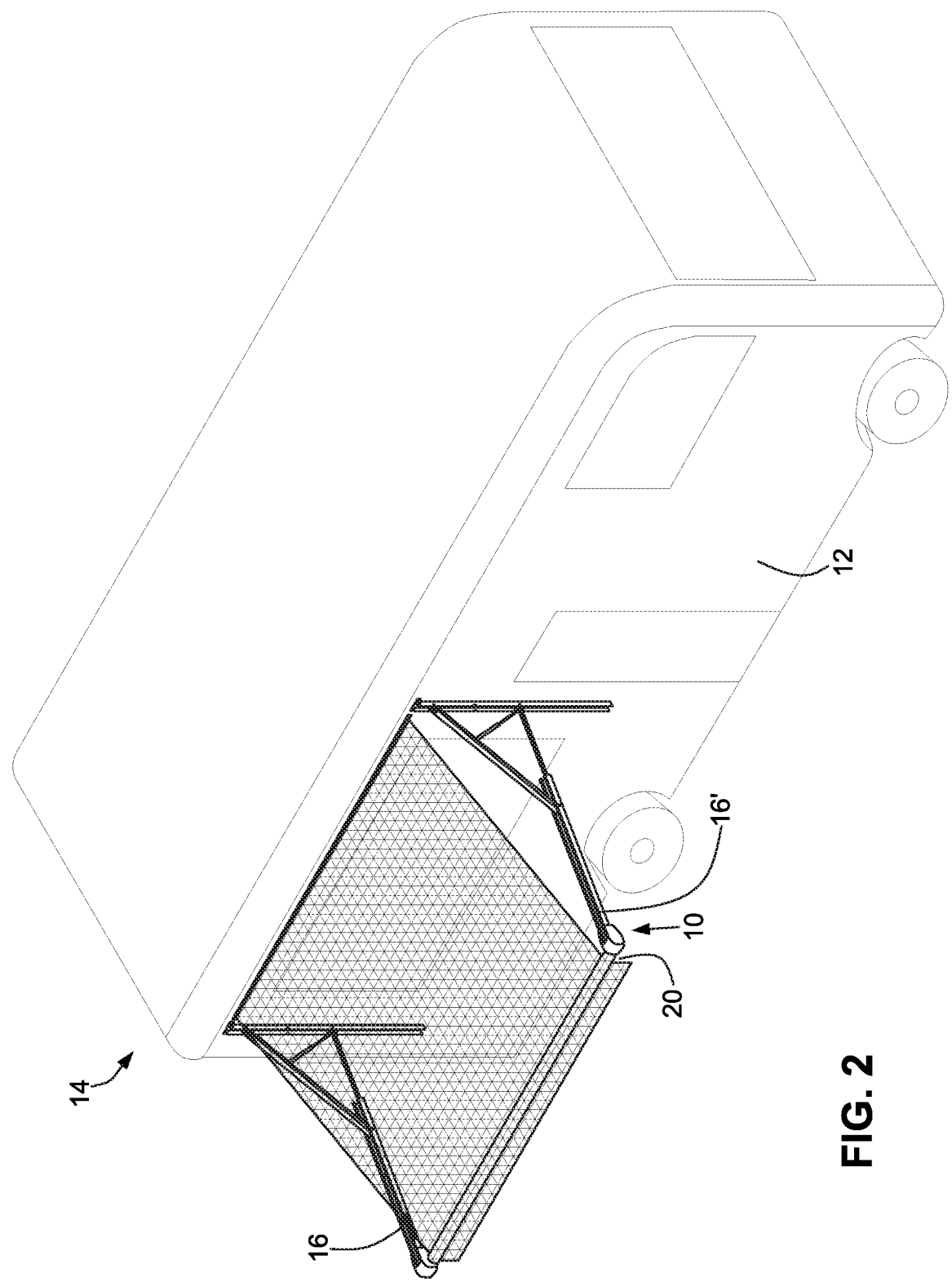
FIG. 2 shows the awning system of FIG. 1 installed on the RV, with the awning system in a fully deployed configuration.
Figure 3:
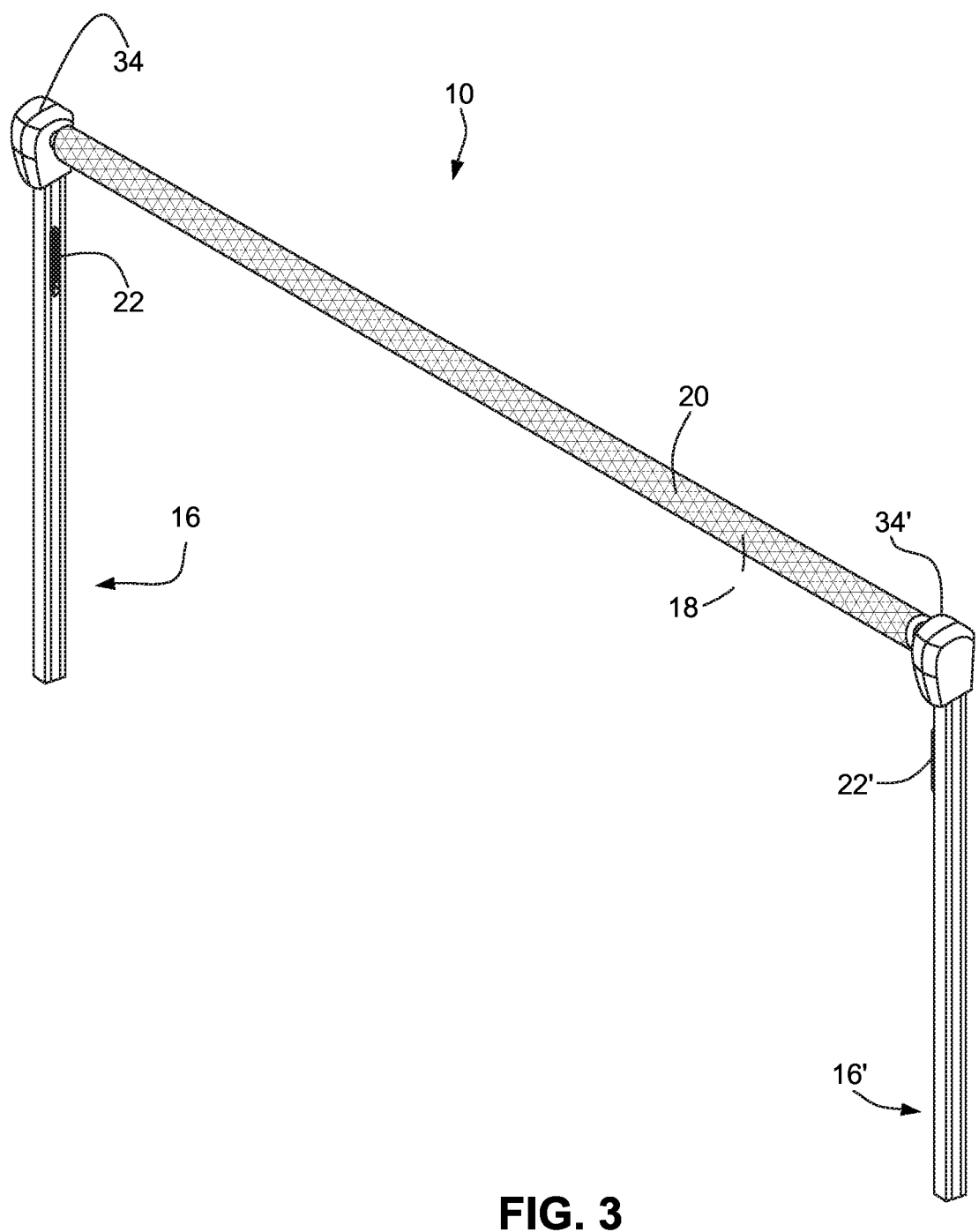
FIG. 3 shows the awning system of FIG. 1 in a fully collapsed configuration.

The drawings show an illustrative awning with integral lighting system 10 as might be installed on a wall 12 of an RV 14. FIGS. 1 and 2 show the system 10 installed on the side wall 12 of the RV 14 in collapsed and deployed configurations, respectively. The system 10 includes first and second spaced-apart support assemblies 16, 16', an awning roller 18 connected between the first and second support assemblies, a canopy 20 connected to the awning roller 18 and connectable to the wall 12, and at least one lighting unit 22 (FIG. 3) integrated with a respective one of the first and second support assemblies 16, 16'.

Figure 4:
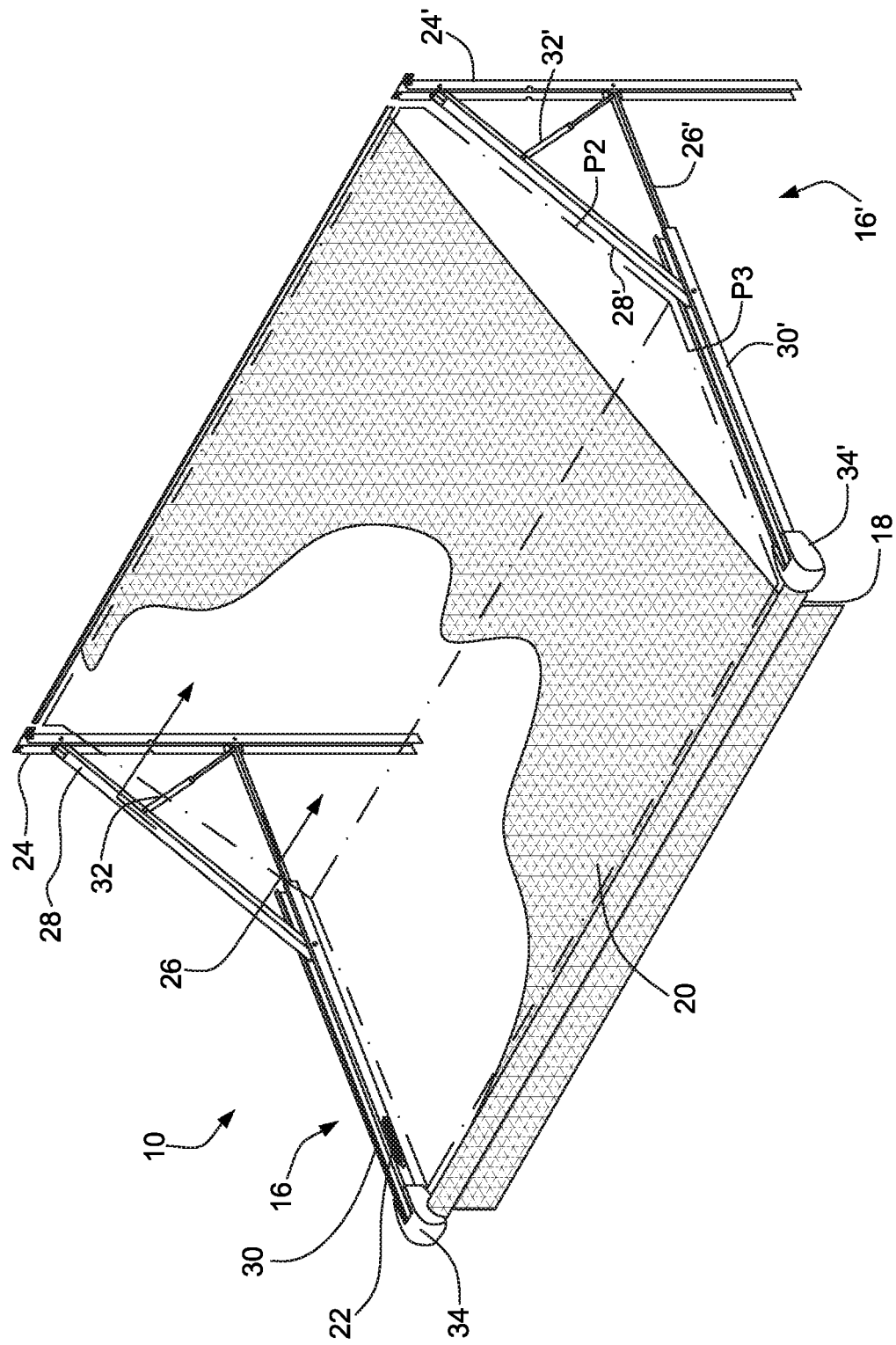
FIG. 4 shows the awning system of FIG. 1 in a fully deployed configuration.

As shown in FIG. 4, the first support assembly 16 includes a base 24 configured for attachment to the wall 12, either directly or through one or more intervening components (not shown). A first support arm 26 extends pivotably from a lower portion of the base. A second support arm 28 extends pivotably from an upper portion of the base. A third support arm 30 extends pivotably from both the first support arm 26 and the second support arm 28. A strut or gas spring 32 acts between the first support arm 26 and the second support arm 28. The pivot arrangement of the support arms 26, 28, 30 is known and will not be further described. A head unit 34 is located at or near an end of the third support arm 30. The head unit 34 may include an electric motor (not shown).

The second support assembly 16' may be identical to or the mirror image of the first support assembly 16. (Elements of the second support assembly 16' having counterparts in the first support assembly 16 may be shown and described herein using like, primed reference characters.) As such, the second support assembly 16' will not be described in further detail herein.

The awning roller 18 may be connected between the respective head units 34, 34' of the first and second support assemblies 16, 16'.

As shown, a first lighting unit 22 is integrated with the third support arm 30 of the first support assembly 16, and a second light unit 22 is integrated with the third support arm 30' of the second support assembly 16'. In other embodiments, more or fewer lighting units 22 could be integrated with either or both of the first support assemblies 16, 16'. For example, no or two or more lighting units 22 could be integrated with the third support arm 30 of the first support assembly 16, and no or two or more lighting units 22 could be integrated with the third support arm 30' of the second support assembly 16'. Also, one or more lighting units 22 could be integrated with one or more of the first and second support arms 26, 28 of the first support assembly 16, and one or more lighting units 22 could be integrated with one or more of the first and second support arms 26', 28' of the second support assembly 16'.

Figure 5:
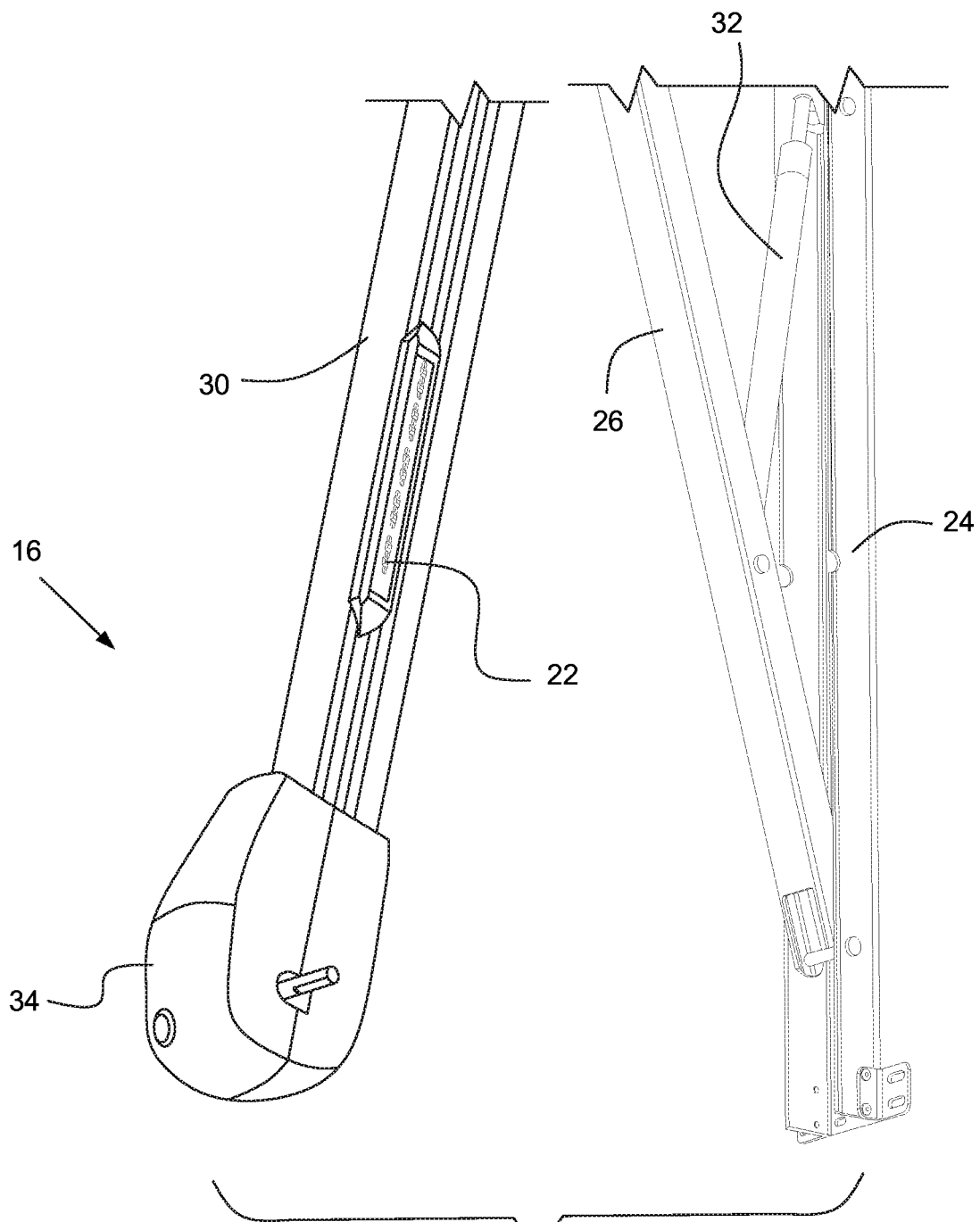
FIG. 5 is a detail view of a portion of the awning system of FIG. 1 in a partially deployed configuration.

As shown in FIG. 5, the first lighting unit 22 is integrated with the third support arm 30 of the first support assembly 16 (similarly, the second lighting unit 22' is integrated with a portion of the third support arm 30' of the second support assembly 16'). Additional lighting units 22, for example, as discussed above, may be similarly integrated into the first and/or second support assemblies 16, 16'.

Any or all of the lighting units 22 may include one or more discrete light sources. As shown, the lighting units 22 may be LED light strips, for example, IL01637 lights strips marketed by Innotec, Inc. of Zeeland, Mich.

Figure 6:
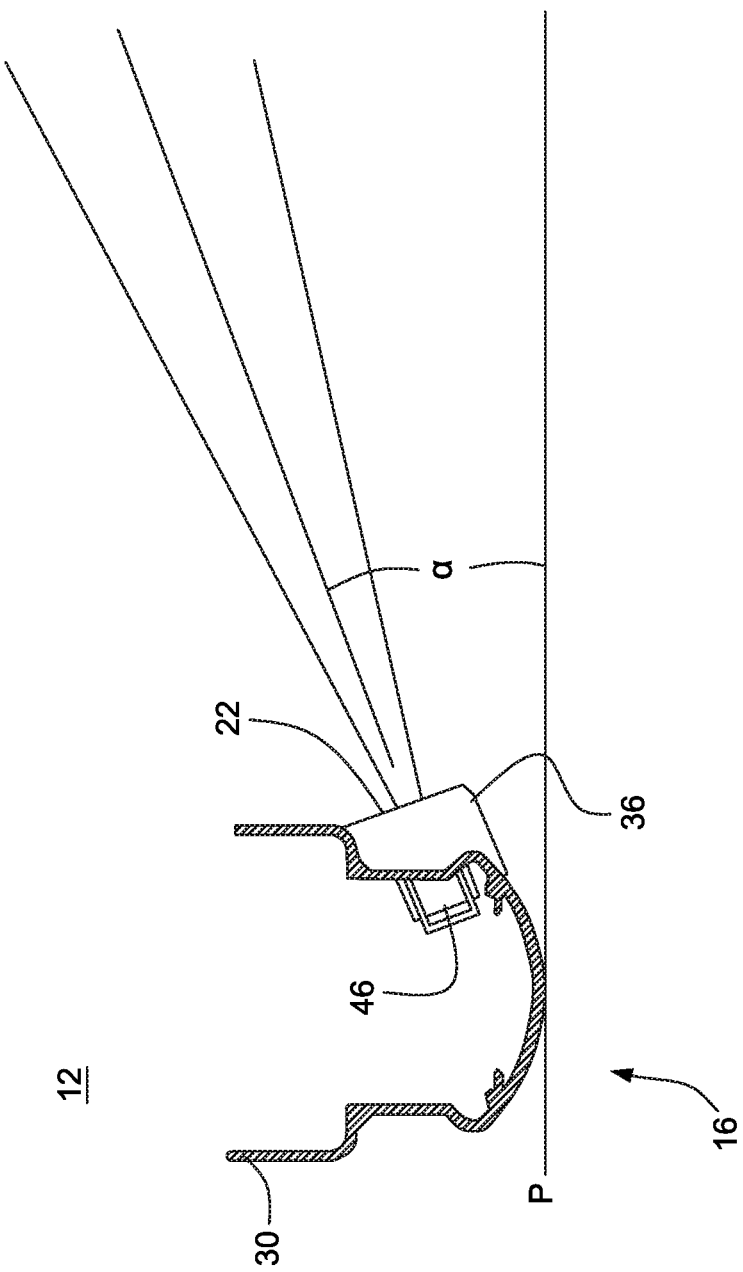
FIG. 6 is a cross-sectional view of a portion of the awning system of FIG. 1 in a fully deployed configuration.

With reference to FIG. 6, any or all of the foregoing lighting units 22 may be configured so as to direct light emitted thereby primarily in a direction offset by an angle α from a plane P intersecting like portions of the third support arm 30 of the first support assembly 16 and the third support arm 30' of the second support assembly 16'. The angle α may be selected so that the light emitted by the lighting units 22 is directed upwardly from the plane P toward the awning canopy 20 when the awning system 10 is fully deployed, and so that the light emitted by the lighting units is directed inwardly from the plane P toward the side wall 12 of the RV 14 when the awning system is fully collapsed. In an embodiment, the angle α may be about 20 degrees, or any angle between about 15 degrees and about 25 degrees, or any angle between about 10 degrees and about 30 degrees or any angle between about 5 degrees and about 35 degrees or any angle between about 0 degrees and about 40 degrees or any greater angle. With the angle α at greater than 0 degrees, substantial light emitted by the lighting units 22 may be reflected downwardly by the canopy 20 when the awning system 10 is fully deployed, and outwardly from the side wall 12 of the RV 14 when the awning system is fully collapsed. The effect of this may be to soften the quality of the light emitted into the space underneath the canopy 20 or adjacent the side wall 12 of the RV 14 and/or to reduce glare.

Figure 7:
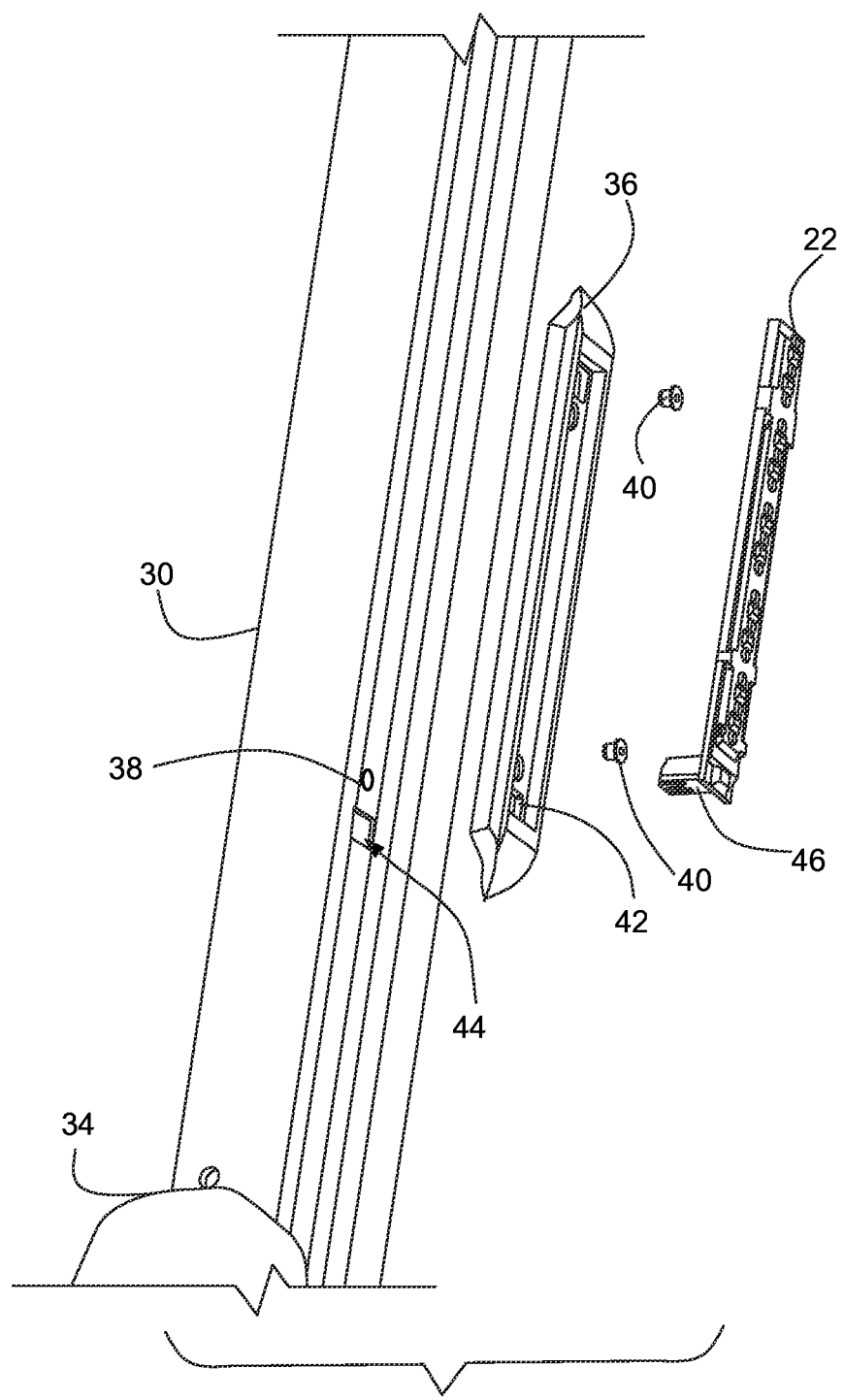
FIG. 7 is an exploded detail view of a lighting unit, mounting bezel, and support arm of the awning system of FIG. 1.

In an embodiment, with continued reference to FIG. 6 and with reference to FIG. 7, any or all of the lighting units 22 may be connected to the respective support arm 30, 30' by an intervening bezel 36 configured to orient the lighting unit(s) at an angle with respect to the mounting surface of the support arm so that the light emitted by the lighting units is directed at the angle α with respect to the plane P. In an embodiment, the lens of the lighting unit 22 may be configured to direct the light at an angle with respect to the mounting surface of the support arm so that the light emitted by the lighting units is directed at the angle α with respect to the plane P.

In embodiments including lighting units 22 integrated with either or both of the second support arms 28, 28', such lighting units may be oriented at any such angle α with respect to a plane P2 intersecting the second support arms 28, 28'. In embodiments including lighting units 22 integrated with either or both of the first support arms 26, 26', such lighting units may be oriented at any such angle α with respect to a plane P3 intersecting the first support arms 26, 26'.

As best shown in FIG. 7, the respective support arm 30, 30' into which the lighting unit 22 is integrated may define one or more holes 38 therethrough for receiving mechanical fasteners 40 that may be used to secure the bezel 36 to the support arm. Each of the bezel 36 and the respective support arm 30, 30' may further define holes 42, 44 therethrough for receiving a portion, for example, a terminal block or connector 46 of the lighting unit 22 therethrough.

With the lighting unit 22 integrated to the respective support assembly, the connector 46 may be disposed in an interior region of the support assembly, for example, in an interior region of the respective third support arm 30, 30'. A mating connector (not shown) may be connected to the connector 46 of the lighting unit 22 and to a cable or wiring harness (not shown) carrying electrical power from a suitable power source located, for example, inside or elsewhere on the RV 14. The cable or wiring harness may be routed from the lighting unit 22 to the power source through one or more interior regions of the respective support assembly 16, 16' and substantially hidden from view. The connector 46 of the lighting unit 22 is configured to permit the respective support assembly 16, 16' to be deployed and collapsed without the connector interfering with the operation thereof.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. An awning system comprising:
a first support assembly having a respective support arm;

a second support assembly having a respective support arm;

an awning roller connected between the first support assembly and the second support assembly;

a canopy rollable onto and unrollable from the awning roller;

a lighting unit integrated with one of the respective support arms of the first support assembly and the second support assembly, the lighting unit configured to direct light emitted thereby primarily toward the canopy when the canopy is fully deployed; and a bezel interposed between the lighting unit and the one of the respective support arms, the bezel positioning the lighting unit at an angle relative to the one of the respective support arms.

2. An awning system according to claim 1, wherein the lighting unit is configured to direct the light emitted thereby primarily inward when the canopy is fully collapsed.

3. An awning system according to claim 1, wherein the bezel is secured to the one of the respective support arms via a mechanical fastener.

4. An awning system according to claim 3, wherein the one of the respective support arms comprises at least one first connector opening, and wherein the bezel comprises a corresponding at least one second connector opening, the mechanical fastener extending through the at least one first connector opening and the at least one second connector opening.

5. An awning system according to claim 1, wherein the bezel comprises a lighting unit connector opening, and wherein the lighting unit comprises a connector block, the connector block engaging the lighting unit connector opening.

6. An awning system according to claim 2, wherein the one of the respective support arms comprises a third connector opening, and wherein the connector block extends through the lighting unit connector opening in the bezel and into the third connector opening.

7. An awning system according to claim 1, wherein the angle is relative to a plane defined by the one of the respective support arms such that the plane varies based on a position of the one of the respective support arms.

8. An awning system according to claim 7, wherein when the canopy is fully deployed, the plane is essentially horizontal relative to ground, and wherein when the canopy is fully collapsed, the plane is essentially vertical relative to ground.

9. An awning system according to claim 1, wherein the angle is about 20 degrees.

10. An awning system according to claim 1, comprising two lighting units respectively integrated with each of the respective support arms of the first support assembly and the second support assembly.

11. An awning system according to claim 10, wherein the two lighting units are respectively attached to facing inside surfaces of the respective support arms of the first support assembly and the second support assembly.

12. An awning system comprising:

a base;

a first pivot arm and a second pivot arm coupled with the base and pivotable relative to the base;

an awning roller connected between the first and second pivot arms;

a canopy supported on the awning roller;

a light strip coupled with at least one of the first and second pivot arms, the light strip being oriented to direct light emitted thereby primarily toward the canopy when the canopy is fully deployed and inward when the canopy is fully collapsed; and a bezel interposed between the light strip and the at least one of the first and second pivot arms, the bezel positioning the light strip at an angle relative to the at least one of the first and second pivot arms.

13. An awning system according to claim 12, wherein the bezel comprises a light strip connector opening, and wherein the light strip comprises a connector block, the connector block engaging the light strip connector opening.

14. An awning system according to claim 13, wherein the at least one of the first and second pivot arms comprises a connector opening, and wherein the connector block extends through the light strip connector opening in the bezel and into the connector opening of the at least one of the first and second pivot arms.

15. An awning system according to claim 12, comprising two of the light strips respectively integrated with each of the first and second pivot arms.

16. An awning system according to claim 12, wherein the light strip is an LED light strip.

\* \* \* \* \*